(12) United States Patent
Martin et al.

(10) Patent No.: US 6,803,413 B2
(45) Date of Patent: Oct. 12, 2004

(54) WATERBORNE THERMOSETTING COMPOSITIONS CONTAINING ALTERNATING COPOLYMERS OF ISOBUTYLENE TYPE MONOMERS

(75) Inventors: Roxalana L. Martin, Pittsburgh, PA (US); Edward R. Coleridge, Lower Burrell, PA (US); Mark A. Tucker, Gibsonia, PA (US); Mary E. Grolemund, Sarver, PA (US)

(73) Assignee: PPG Industries Onio, Inc., Cleveland, OH (US)

( * ) Notice: Subject to any disclaimer, the term of this patent is extended or adjusted under 35 U.S.C. 154(b) by 0 days.

(21) Appl. No.: 10/358,041

(22) Filed: Feb. 4, 2003

(65) Prior Publication Data

US 2003/0187145 A1 Oct. 2, 2003

Related U.S. Application Data

(63) Continuation-in-part of application No. 10/077,645, filed on Feb. 15, 2002.

(51) Int. Cl.$^7$ .............................................. C08L 63/00
(52) U.S. Cl. ...................................... 525/110; 524/512
(58) Field of Search .......................... 525/110; 524/512

(56) References Cited

U.S. PATENT DOCUMENTS

| | | | |
|---|---|---|---|
| 2,378,629 A | 6/1945 | Hanford | 260/78 |
| 2,411,599 A | 11/1946 | Sparks et al. | 204/162 |
| 2,531,196 A | 11/1950 | Brubaker et al. | 260/85.5 |
| 3,947,338 A | 3/1976 | Jerabek et al. | 204/181 |
| 3,984,299 A | 10/1976 | Jerabek | 204/181 |
| 4,147,679 A | 4/1979 | Scriven et al. | 260/29.2 TN |
| 4,147,688 A | 4/1979 | Makhlouf et al. | 260/33.6 EP |
| 4,220,679 A | 9/1980 | Backhouse | 427/401 |
| 4,403,003 A | 9/1983 | Backhouse | 427/407.1 |
| 4,681,811 A | 7/1987 | Simpson et al. | 428/413 |
| 4,732,790 A | 3/1988 | Blackburn et al. | 427/407.1 |
| 4,798,746 A | 1/1989 | Claar et al. | 427/407.1 |
| 4,889,890 A | 12/1989 | Kerr et al. | 525/113 |
| 4,937,288 A | 6/1990 | Pettit, Jr. et al. | 525/176 |
| 4,997,900 A | 3/1991 | Brinkman | 528/45 |
| 5,071,904 A | 12/1991 | Martin et al. | 524/458 |
| 5,084,541 A | 1/1992 | Jacobs, III et al. | 528/45 |
| 5,098,947 A | 3/1992 | Metzger et al. | 524/507 |
| 5,098,955 A | 3/1992 | Pettit, Jr. | 525/194 |
| 5,202,382 A | 4/1993 | Pettit, Jr. | 525/108 |
| 5,214,101 A | 5/1993 | Pettit, Jr. et al. | 525/176 |
| 5,356,973 A | 10/1994 | Taljan et al. | 524/314 |
| 5,407,707 A | 4/1995 | Simeone et al. | 427/410 |
| 5,439,896 A | 8/1995 | Ito et al. | 525/107 |
| 5,508,337 A | 4/1996 | Wamprecht et al. | 524/507 |
| 5,510,444 A | 4/1996 | Halpaap et al. | 528/45 |
| 5,552,487 A | 9/1996 | Clark et al. | 525/131 |
| 5,554,692 A | 9/1996 | Ross | 525/124 |
| 5,663,240 A | 9/1997 | Simeone et al. | 525/327.3 |
| 5,710,214 A | 1/1998 | Chou et al. | 525/124 |
| 5,777,061 A | 7/1998 | Yonek et al. | 528/45 |
| 5,807,937 A | 9/1998 | Matyjaszewski et al. | 526/135 |
| 5,976,701 A | 11/1999 | Barancyk et al. | 428/423.1 |
| 5,989,642 A | 11/1999 | Singer et al. | 427/407.1 |
| 6,111,001 A | 8/2000 | Barancyk et al. | 524/211 |
| 6,114,489 A | 9/2000 | Vicari et al. | 528/84 |
| 6,281,272 B1 | 8/2001 | Baldy et al. | 523/501 |
| 6,355,729 B1 * | 3/2002 | McCollum et al. | 525/123 |
| 6,365,666 B1 * | 4/2002 | McCollum et al. | 524/548 |
| 6,479,109 B2 * | 11/2002 | McCollum et al. | 427/458 |
| 6,509,407 B2 * | 1/2003 | McCollum et al. | 524/507 |
| 2003/0018151 A1 * | 1/2003 | White et al. | 526/219.6 |

OTHER PUBLICATIONS

Greenley, "Q and e Values for Free Radical Copolymerizations of Vinyl Monomers and Telogens," *Polymer Handbook*, Fourth Edition, John Wiley & Sons, Inc., pp. 309–319, 1999.

Odian, "Chain Copolymerization," *Principles of Polymerization*, Third Edition, John Wiley & Sons, Inc., pp. 452–491, 1991.

Cowie, *Alternating Copolymers*, Plenum Press, pp. 1–137, 1985.

Rzaev et al., "Complex–Radical Copolymerization of 2,4,4–trimethylpentene–1 with Maleic Anhydride," *Eur. Polym. J.*, vol. 34, No. 7, pp. 981–985, 1998.

(List continued on next page.)

Primary Examiner—Bernard Lipman
(74) Attorney, Agent, or Firm—William J. Uhl

(57) ABSTRACT

A curable, aqueous film-forming composition is provided, comprising:

(a) a copolymer containing reactive functional groups and comprising at least 30 mol % of residues having alternating structural units:

—[DM—AM]— wherein DM represents a residue from a donor monomer, and AM represents a residue from an acceptor monomer, at least 15 mol % of the copolymer comprising a donor monomer having the structure (I):

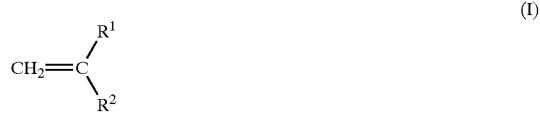

wherein $R^1$ is linear or branched $C_1$ to $C_4$ alkyl, $R^2$ is selected from methyl, linear, cyclic or branched $C_1$ to $C_{20}$ alkyl, alkenyl, aryl, alkaryl and aralkyl; and (b) a curing agent having functional groups reactive with the reactive functional groups of (a).

The invention is also directed to a multi-component composite coating composition including a base coat deposited from a pigmented film-forming composition and a transparent topcoat applied over the base coat. At least one coat is the film-forming composition described above.

35 Claims, No Drawings

OTHER PUBLICATIONS

Mashita et al., "Alternating Copolymerization of Isobutylene and Acrylic Ester with Alkylboron Halide," *Polymer*, vol. 36, No. 15, pp. 2973–2982, 1995.

Mashita et al., "Alternating Copolymers of Isobutylene and Acrylic Ester by Complexed Copolymerization," *Polymer*, vol. 36, No. 15, pp. 2983–2988, 1995.

Kuntz et al., "Poly [2,2–Dimethyl–4–(methoxylcarbonyl) butylene]: Synthesis with an Ethylaluminum Sesquichloride–Peroxide Initiator and NMR Characterization," *J. of Polymer Science*: Polymer Chemistry Edition, vol. 16, pp. 1747–1753, 1978.

Hirooka et al., "Complexed Copolymerization of Vinyl Compounds with Alkylaluminum Halides," *Journal of Polymer Science: Polymer Chemistry Edition*, vol. 11, pp. 1281–1306, 1973.

ASTM D–1200—94, "Standard Test Method for Viscosity by Ford Viscosity Cup," *Amer. Soc. Test. Mat.*, pp. 103–105, 1994.

ASTM D–2369 —92, "Standard Test Method for Volatile Content of Coatings," *Amer. Soc. Test. Mat.*, pp. 46–48, 1992.

ASTM D–3359 —97, "Standard Test Methods for Measuring Adhesion by Tape Test," Amer. Soc. Test. Mat., pp. 1–7, 1998.

ASTM D–4370 —84, "Standard Test Methods for Acid and Base Milliequivalent Content of Electrocoat Bath," Amer. Soc. Test. Mat., pp. 780–782, 1984.

"Reference Method 24: Determination of Volatile Matter Content, Water Content, Density, Volume Solids, and Weight Solids of Surface Coatings," *Federal Register*, EPA Reference Methods 24 and 24 A, Volume 57, No. 133, pp. 125–127, 1992.

* cited by examiner

WATERBORNE THERMOSETTING COMPOSITIONS CONTAINING ALTERNATING COPOLYMERS OF ISOBUTYLENE TYPE MONOMERS

CROSS-REFERENCE TO RELATED APPLICATION

This application is a continuation-in-part of U.S. patent application Ser. No. 10/077,645, entitled "Thermosetting Compositions Containing Alternating Copolymers of Isobutylene Type Monomers", filed on Feb. 15, 2002 pending.

BACKGROUND OF THE INVENTION

1. Field of the Invention

The present invention relates generally to waterborne thermosetting compositions that contain copolymers of vinyl monomers. More specifically, the present invention is directed to waterborne thermosetting compositions that contain functional copolymers containing isobutylene type monomers.

2. Description of Related Art

Reducing the environmental impact of coating compositions, in particular that associated with emissions into the air of volatile organics during their use, has been an area of ongoing investigation and development in recent years. Accordingly, interest in high solids waterborne coatings has been increasingly due, in part, to their inherently low volatile organic content (VOC), which significantly reduces air emissions during the application process. While both thermoplastic and thermoset coating compositions are commercially available, thermoset coatings are typically more desirable because of their superior physical properties, e.g., hardness and solvent resistance.

Low VOC coatings are particularly desirable in the automotive original equipment manufacture (OEM) market due to the relatively large volume of coatings that are used. However, in addition to the requirement of low VOC levels, automotive manufacturers have very strict performance requirements of the coatings that are used. For example, automotive OEM clear top coats are typically required to have a combination of good exterior durability, acid etch and water spot resistance, and excellent gloss and appearance. While liquid top coats containing, for example, capped polyisocyanate and polyol components, can provide such properties, they have the undesirable drawback of higher VOC levels relative to higher solids liquid coatings or powder coatings, which have essentially zero VOC levels.

Functional polymers used in coating compositions are typically random copolymers that include functional group-containing acrylic and/or methacrylic monomers. Such a functional copolymer will contain a mixture of polymer molecules having varying individual functional equivalent weights and polymer chain structures. In such a copolymer, the functional groups are located randomly along the polymer chain. Moreover, the number of functional groups is not divided equally among the polymer molecules, such that some polymer molecules may actually be free of functionality.

In a thermosetting composition, the formation of a three-dimensional crosslinked network is dependent on the functional equivalent weight, as well as the architecture of the individual polymer molecules that comprise it. Polymer molecules having little or no reactive functionality (or having functional groups that are unlikely to participate in crosslinking reactions due to their locations along the polymer chain) will contribute little or nothing to the formation of the three-dimensional crosslinked network, resulting in decreased crosslink density and less than optimum physical properties of the finally formed thermoset coating.

Many patents express the potential for using isobutylene-containing polymers in coating compositions. For example, U.S. Pat. No. 6,114,489 to Vicari et al. discloses a coating composition that includes a functional acrylic resin binder; a co-reactant capable of reacting with the functionality of the acrylic binder; a degasser; and a hyperbranched polyester flow and leveling agent. Isobutylene is suggested as a potential co-monomer for use in the acrylic binder as part of a long list of monomers. U.S. Pat. No. 5,552,487 to Clark et al. discloses powder coating compositions that include a copolymer having a reactive functionality and a suitable crosslinking agent capable of reaction with the reactive functionality of the copolymer. The copolymer is a made by copolymerizing functional monomers with other monomers, isobutylene being one among many listed as potential co-monomers. Although only two are referenced herein, of the many patents that express the possibility of using isobutylene-type co-monomers, none actually shows or discloses a working example of such a copolymer.

The fact that no examples of isobutylene-type monomer-containing copolymers in coating compositions can be found is most likely due to the generally non-reactive nature of isobutylene with acrylic and methacrylic monomers. Reactivity ratios for monomers can be calculated using the Alfrey-Price Q-e values (Robert Z. Greenley, Polymer Handbook, Fourth Edition, Brandrup, Immergut and Gulke, editors, Wiley & Sons, New York, N.Y., pp. 309–319 (1999)). The calculations may be carried out using the formulas I and II:

$$r_1 = (Q_1/Q_2)\exp\{-e_1(e_1-e_2)\} \quad \text{I}$$

$$r_2 = (Q_2/Q_1)\exp\{-e_2(e_2-e_1)\} \quad \text{II}$$

where $r_1$ and $r_2$ are the respective reactivity ratios of monomers 1 and 2, and $Q_1$ and $Q_2$ and $e_1$ and $e_2$ are the respective reactivity and polarity values for the respective monomers (Odian, *Principals of Polymerization*, $3^{rd}$ Ed., Wiley-Interscience, New York, N.Y., Chapter 6, pp. 452–467 and 489–491 (1991)). Table 1 shows the calculated reactivity ratios of selected monomers with isobutylene:

TABLE 1

| Monomer | $r_1$ (isobutylene) | $r_2$ |
|---|---|---|
| Methyl acrylate | 0.10 | 13.67 |
| Glycidyl methacrylate | 0.08 | 34.17 |
| Methacrylic acid | 0.09 | 39.71 |

As one skilled in the art of polymer chemistry can appreciate, when $r_1$ is near zero and $r_2$ has a value of 10 or more, monomer 2 is reactive toward both monomers and monomer 1 is reactive toward neither monomer. In other words, it is extremely difficult to prepare copolymers having significant amounts of both monomers. It is not surprising then that no examples can be found of coating compositions that include isobutylene-type monomer-containing copolymers, because the monomers do not tend to copolymerize.

In some cases, it is observed that monomers that do not readily homopolymerize are able to undergo rapid copolymerization reactions with each other. The most typical situation occurs when a strong electron donating monomer is mixed with a strong electron accepting monomer from which a regular alternating copolymer results after free radical initiation. Maleic anhydride is a widely used example of a strong electron accepting monomer. Styrene and vinyl ethers are typical examples of electron donating monomers. Systems, such as maleic anhydride—styrene, are known to form charge transfer complexes, which tend to place the monomers in alternating sequence prior to initiation. The application of the free radical initiator "ties" the ordered monomers together to form an alternating copolymer (Cowie, Alternating Copolymers, Plenum, N.Y. (1985)).

U.S. Pat. Nos. 2,378,629 to Hanford and 4,151,336 to Sackman et al. disclose that even when a moderately electron donating monomer, such as diisobutylene, is copolymerized with a strong electron acceptor monomer, such as maleic anhydride, an alternating copolymer results.

When a moderately electron donating monomer, such as isobutylene, is copolymerized with a moderately electron accepting monomer, such as an acrylic ester, poor incorporation of the electron donating monomer results. For example, free radical copolymerization of isobutylene (IB) and acrylic monomers has resulted in copolymers that contain at no more than 20–30% of IB and have low molecular weights because of the degradative chain transfer of IB. Examples of such copolymerizations of IB are disclosed by U.S. Pat. No. 2,411,599 to Sparks et al. and U.S. Pat. No. 2,531,196 to Brubaker et al.

Conjugated monomers, such as acrylic esters and acrylonitrile, have been shown to react with monomers such as propylene, isobutylene, and styrene, in the presence of Lewis acids, such as alkylaluminum halides, to give 1:1 alternating copolymers. The alternating copolymers were obtained when the concentration ratio of the Lewis acids to the acrylic esters was 0.9 and the concentration of IB was greater than the concentration of the acrylic esters (Hirooka et al, J. Polym. Sci. Polym. Chem., 11, 1281 (1973)). The metal halides vary the reactivity of the monomers by complexing with them. The electron donor monomer—electron acceptor monomer—metal halide complex leads to alternating copolymers (Mashita et al. Polymer, Vol. 36, No. 15, pp. 2973–2982, (1995)).

Copolymers of IB and methyl acrylate (MA) have also been obtained by using ethyl aluminum sesquichloride and 2-methyl pentanoyl peroxide as an initiating system. The resulting copolymer had an alternating structure, with either low (Kuntz et al, J. Polym. Sci. Polym. Chem., 16, 1747 (1978)) or high isotacticity in the presence of $EtAlCl_2$ (10 molar % relative to MA). (Florjanczyk et al, Makromol. Chem., 183, 1081 (1982)).

Another method for making IB copolymers with acrylic esters involved alkyl boron halide, which was found to be much more active than alkyl aluminum halides in forming alternating copolymers. The resulting copolymer was an elastomer of high tensile strength and high thermal decomposition temperature with good oil resistance, especially at elevated temperatures (Mashita et al, Polymer, 36, 2983 (1995)).

U.S. Pat. No. 5,807,937 to Matyjaszewski et al. discloses a method of making alternating copolymers of isobutylene and methyl acrylate using an atom transfer radical polymerization (ATRP) process. The method requires the use of a suitable ATRP initiator, such as 1-phenylethyl bromide, and a suitable transition metal salt, such as CuBr with a ligand, such as 2,2'-bipyridyl, to perform the complex redox initiation and propagation steps of the polymerization process.

Copolymers containing relatively high amounts (≧30 mol %) of IB and acrylic esters have only been attained by free radical polymerization when Lewis acids or ATRP initiation systems have been employed. The polymer that results from such processes requires expensive and time consuming clean up to remove the transition metal salt and/or Lewis acid residues in order to make the polymer commercially useful.

Copolymer compositions that contain Lewis acids and/or transition metals intermingled with the copolymer can have a number of drawbacks when used commercially in coating compositions. First, some Lewis acids and transition metals are toxic and have adverse environmental effects if they are leached from the copolymer and enter the environment. Second, in coating applications the Lewis acids and transition metals may lead to poor color stability when the coating is exposed to UV light or simply cause the coating to discolor through other reactions or interactions. Further, the Lewis acids and transition metals may react with other ingredients in a coating formulation resulting in undesired properties, such as a shortened shelf-life for a given coating formulation.

It would be desirable to develop waterborne thermosetting compositions that comprise functional copolymers having a well-defined polymer chain structure. In particular, alternating copolymers containing isobutylene-type monomers that are substantially free of Lewis acids and transition metals would be desirable. Such compositions would have lower VOC levels and a combination of favorable performance properties particularly in coatings applications.

SUMMARY OF THE INVENTION

The present invention is directed to a waterborne thermosetting composition that includes a copolymer composition and a crosslinking agent. In particular, a curable, aqueous film-forming composition is provided, comprising:

(a) a copolymer serving as a polymeric binder containing two or more reactive functional groups, said copolymer comprising at least 30 mol % of residues having the following alternating structural units:

—[DM—AM]— wherein DM represents a residue from a donor monomer, and AM represents a residue from an acceptor monomer; and (b) a curing agent having at least two functional groups which are reactive with the reactive functional groups of (a). At least 15 mol % of the copolymer comprises a donor monomer having the following structure (I):

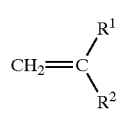

(I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl.

In a specific embodiment, at least 15 mol % of the copolymer comprises an acrylic monomer as an acceptor monomer. The copolymer may contain at least one salt group or salt forming group to aid in water dispersibility. The copolymer composition is preferably substantially free of Lewis acids and transition metals.

The present invention is also additionally directed to a multi-component composite coating composition that includes a base coat deposited from a pigmented film-forming composition and a transparent top coat applied over the base coat. The top coat is the film-forming composition described above.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable, ethylenically unsaturated group that has relatively high electron density in the ethylenic double bond, and the term "acceptor monomer" refers to monomers that have a polymerizable, ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable, ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

The present invention is directed to a waterborne thermosetting composition that includes a copolymer composition as a polymeric binder, that contains a functional group-containing copolymer having at least 30 mol %, in many cases at least 40 mol %, typically at least 50 mol %, in some cases at least 60 mol and in other cases at least 75 mol % of residues of the copolymer derived from alternating sequences of donor monomer-acceptor monomer pairs having the alternating monomer residue units of structure:

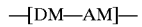

where DM represents a residue from a donor monomer and AM represents a residue from an acceptor monomer. The copolymer may be a 100% alternating copolymer of DM and AM. More particularly, at least 15 mol % of the copolymer comprises a donor monomer, which is an isobutylene-type monomer, having the following structure (I):

where $R^1$ is linear or branched $C_1$ to $C_4$ alkyl; $R^2$ is one or more of methyl, linear, cyclic, or branched $C_1$ to $C_{20}$ alkyl, alkenyl, aryl, alkaryl, and aralkyl. In a particular embodiment, at least 15 mol % of the copolymer includes an acrylic monomer as an acceptor monomer. The group $R^2$ may include one or more functional groups selected from hydroxy, epoxy, carboxylic acid, ether, carbamate, and amide.

Thermosetting compositions of the present invention often have a VOC content of less than 4 percent by weight, typically less than 3.5 percent by weight and many times less than 3 percent by weight.

Of note in the present copolymer is that the copolymer incorporates a substantial portion of alternating residues of a mild donor monomer as described by structure I and a mild acceptor monomer, which is an acrylic monomer. A non-limiting list of published e values for monomers that may be included as monomers described by structure I and acrylic monomers of the present invention are shown in Table 2.

TABLE 2

Alfrey-Price e values for Selected Monomers

| Monomer | e value |
| --- | --- |
| Monomers of structure | 1 |
| Isobutylene | −1.20[1] |
| Diisobutylene | 0.49[2] |
| Acrylic Monomers | |
| Acrylic Acid | 0.88[1] |
| Acrylamide | 0.54[1] |
| Acrylonitrile | 1.23[1] |
| Methyl Acrylate | 0.64[1] |
| Ethyl Acrylate | 0.55[1] |
| Butyl Acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

Typically, the copolymer used as the polymeric binder (a) in the film-forming composition of the present invention is substantially free of maleate monomer residues and fumarate monomer residues, which usually have e values greater than 2.0. These types of multifunctional monomers provide too many functional groups to the copolymer. This can create problems, for example, in coatings where a thermosetting composition may have a short shelf-life due to the overly functional nature of the copolymer.

Further, the present copolymer composition is substantially free of transition metals and Lewis acids which, as noted above, have been used in the prior art to make alternating copolymers of mild donor monomers and mild acceptor monomers. The present invention does not utilize transition metal or Lewis acid adjuncts in preparing the present copolymer composition, therefore, they do not need to be removed after polymerization and the resulting copolymer compositions will not suffer the drawbacks inherent in those that contain transition metals or Lewis acids.

Any suitable donor monomer may be used in the preparation of the copolymer. Suitable donor monomers that may be used include strong donor monomers and mild donor monomers. Mild donor monomers are particularly useful for preparing alternating copolymers. The copolymers will include a mild donor monomer described by structure I, such as isobutylene and diisobutylene, dipentene, and isoprenol, and may additionally include other suitable mild donor monomers. The mild donor monomer of structure I is present in the copolymer composition at a level of at least 15 mol %, in some cases at least 25 mol %, typically at least 30 mol %, and, in some cases, at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure I may be present in the copolymer composition in any range of values inclusive of those stated above.

Suitable other donor monomers that may be used in the preparation of the copolymer include, but are not limited to, ethylene, butene, styrene, substituted styrenes, methyl styrene, substituted styrenes, vinyl ethers, vinyl esters, vinyl pyridines, divinyl benzene, vinyl naphthalene, and divinyl naphthalene. Vinyl esters include vinyl esters of carboxylic acids, which include, but are not limited to, vinyl acetate, vinyl butyrate, vinyl 3,4-dimethoxybenzoate, and vinyl benzoate. The use of other donor monomers is optional. When other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer-acceptor monomer units along the copolymer chain. It is to be understood that acceptor monomers as used in the preparation of the copolymer are not to be construed as Lewis acids, the use of which as catalysts is undesirable in the present invention as discussed above. Any suitable acceptor monomer may be used. Suitable acceptor monomers include strong acceptor monomers and mild acceptor monomers. A non-limiting class of suitable acceptor monomers are those described by the structure (II):

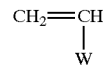

(II)

where W is selected from the group consisting of —CN, —X, and —C(═O)—Y, wherein Y is selected from the group consisting of —NR$^3_2$, —O—R$^5$—O—C(═O)—NR$^3_2$, and —OR$^4$, R$^3$ is selected from the group consisting of H, linear or branched C$_1$ to C$_{20}$ alkyl, and linear or branched C$_1$ to C$_{20}$ alkylol, R$^4$ is selected from the group consisting of H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, and a polysiloxane radical, R$^5$ is a divalent linear or branched C$_1$ to C$_{20}$ alkyl linking group, and X is a halide.

A class of mild acceptor monomers that may be included in the present copolymer composition are acrylic acceptor monomers. Suitable acrylic acceptor monomers include those described by structure (III):

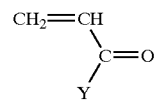

(III)

where Y is selected from the group consisting of —NR$^3_2$, —O—R$^5$—O—C(═O)—NR$^3_2$, and —OR$^4$, R$^3$ is selected from the group consisting of H, linear or branched C$_1$ to C$_{20}$ alkyl, and linear or branched C$_1$ to C$_{20}$ alkylol, R$^4$ is selected from the group consisting of H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, and a polysiloxane radical, and R$^5$ is a divalent linear or branched C$_1$ to C$_{20}$ alkyl linking group.

Particularly useful acrylic acceptor monomers are those described by structure III where Y includes at least one functional group selected from hydroxy, amide, oxazoline, aceto acetate, blocked isocyanate, carbamate, and amine. Y groups may be converted to salt groups selected from carboxylic acid salt, amine salt, quaternized ammonium, quaternized phosphonium and ternary sulfonium using techniques known to those skilled in the art.

Examples of suitable acceptor monomers include, but are not limited to, hydroxyethyl acrylate, hydroxypropyl acrylate, 4-hydroxybutyl acrylate, acrylic acid, methyl acrylate, ethyl acrylate, butyl acrylate, isobutyl acrylate, isobornyl acrylate, dimethylaminoethyl acrylate, acrylamide, perfluoro methyl ethyl acrylate, perfluoro ethyl ethyl acrylate, perfluoro butyl ethyl acrylate, trifluoromethyl benzyl acrylate, perfluoro alkyl ethyl, acryloxyalkyl terminated polydimethylsiloxane, acryloxyalkyl tris (trimethylsiloxy silane), and acryloxyalkyl trimethylsiloxy terminated polyethylene oxide, chlorotrifluoro ethylene, glycidyl acrylate, 2-ethylhexyl acrylate, and n-butoxy methyl acrylamide.

The acrylic acceptor monomers of structure III may be present in the copolymer composition at a level of at least 15 mol %, in some cases at least 25 mol %, typically at least 30 mol %, and, in some cases, at least 35 mol %. The acrylic acceptor monomers of structure III may be present in the copolymer composition at a level of up to 50 mol %, in some cases up to 47.5 mol %, typically up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in the copolymer include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. The use of other mild acceptor monomers is optional, when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

The copolymer has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 30,000, in some cases not exceed 25,000, in other cases not exceed 20,000, and, in certain instances, not exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the copolymer is not always critical. The polydispersity index of the copolymer is usually less than 4, in many cases less than 3.5, typically less than 3.0, and, in some cases, less than 2.5. As used herein and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

In an embodiment of the present invention, in the copolymer composition, the alternating sequences of donor monomer-acceptor monomer pairs are residues having the alternating structure IV:

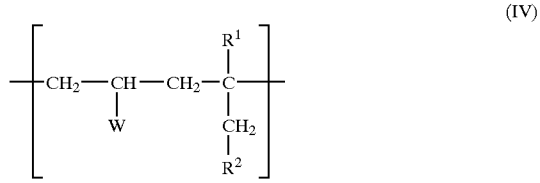

where $R^1$, $R^2$, and W are defined as above. A particularly preferred embodiment is one wherein the monomer residues containing the group W are derived from one or more acrylic monomers, and the monomer residues containing the groups $R^1$ and $R^2$ are derived from one or a combination of diisobutylene, isobutylene, dipentene, and isoprenol. The copolymer compositions of the present invention may also include other polymerizable, ethylenically unsaturated monomers.

The copolymer used as the polymeric binder (a) in the waterborne film-forming composition of the present invention may have all of the incorporated monomer residues in an alternating architecture. A non-limiting example of a copolymer segment having 100% alternating architecture of diisobutylene (DIIB) and an acrylic monomer (Ac) is shown by structure V:

-Ac-DIIB-Ac-DIIB-Ac-DIIB-Ac-DIIB-Ac-DIIB-Ac-DIIB-Ac-  (V)

However, in most instances, the copolymer will contain alternating segments and random segments as shown by structure VI, a copolymer of DIIB, Ac and other monomers, M:

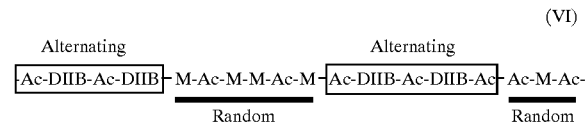

Structure VI shows an embodiment of the present invention where the copolymer may include alternating segments as shown in the boxes and random segments as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer-acceptor monomer pairs are meant to include segments of monomer residues such as those shown by the boxes in structure VI.

The other ethylenically unsaturated monomers include any suitable monomer not traditionally categorized as being an acceptor monomer or a donor monomer.

The other ethylenically unsaturated monomers, residue M of structure VI, is derived from at least one ethylenically unsaturated, radically polymerizable monomer. As used herein and in the claims, "ethylenically unsaturated, radically polymerizable monomer", and like terms, are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, monomer residues derived from monomers of the general formula VII:

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R_{13}$ is selected from the group consisting of H, $C_1$–$C_6$ alkyl, and $COOR^{15}$, wherein $R^{15}$ is selected from the group consisting of H, an alkali metal, a $C_1$ to $C_6$ alkyl group, glycidyl, and aryl.

Specific examples of other monomers, M, that may be used in the copolymer (a) include methacrylic monomers and allylic monomers. Residue M may be derived from at least one of alkyl methacrylate having from 1 to 20 carbon atoms in the alkyl group. Specific examples of alkyl methacrylates having from 1 to 20 carbon atoms in the alkyl group from which residue M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, as well as functional methacrylates, such as hydroxyalkyl methacrylates, oxirane functional methacrylates, and carboxylic acid functional methacrylates.

Residue M may also be selected from monomers having more than one methacrylate group, for example, methacrylic anhydride and diethyleneglycol bis(methacrylate).

As used herein and in the claims, by "allylic monomer(s)" is meant monomers containing substituted and/or unsubstituted allylic functionality, i.e., one or more radicals represented by the following general formula VIII,

$$H_2C\!=\!C(R^{10})\!-\!CH_2\!- \qquad (VIII)$$

where $R^{10}$ is hydrogen, halogen, or a $C_1$ to $C_4$ alkyl group. Most commonly, $R^{10}$ is hydrogen or methyl and, consequently, general formula VIII represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

The copolymer composition used as the polymeric binder (a) in the film-forming composition is prepared by a method including the steps of (a) providing a donor monomer composition comprising one or more donor monomers of structure I; (b) mixing an ethylenically unsaturated monomer composition comprising one or more acceptor monomers with (a) to form a total monomer composition substantially free of maleate- and fumarate-type monomers; and (c) polymerizing the total monomer composition in the presence of a free radical initiator in the substantial absence of transition metals and Lewis acids. In an embodiment of the present invention, the ethylenically unsaturated monomer composition includes monomers of structure III.

In an embodiment of the present invention, the monomer of structure I is present at a molar excess based on the amount of acrylic acceptor monomer. Any amount of excess monomer of structure I may be used in the making of the copolymer in order to encourage the formation of the desired alternating architecture. The excess amount of monomer of structure I may be at least 10 mol %, in some cases up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present invention, the acrylic acceptor monomer is present in an amount of at least 15 mol %, in some cases 17.5 mol %, typically at least 20 mol %, and, in some cases, 25 mol % of the total monomer composition. The acrylic acceptor monomer may further be present in an amount up to 50 mol %, in some cases up to 47.5 mol %, typically up to 45 mol %, and, in some cases, up to 40 mol % of the total monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition may include other donor monomers as described above, as well as other monomers designated by M and described above. The use of other mild acceptor monomers is optional. When other mild acceptor monomers are present, they are present at a level of at least 0.01 mol % of the copolymer composition, often at least 0.1 mol %, typically at least 1 mol %, and, in some cases, at least 2 mol % of the total monomer composition. The other acceptor monomers may be present at up to 35 mol %, in some cases up to 25 mol %, typically up to 15 mol %, and, in some cases, up to 10 mol % of the total monomer composition. The level of other acceptor monomers used herein is determined by the properties that are to be incorporated into the copolymer composition. Residues from the other acceptor monomers may be present in the copolymer composition in any range of values inclusive of those stated above.

In an embodiment of the present invention, an excess of monomer of structure I is used in the preparation of the copolymer and the unreacted monomer of structure I is removed from the resulting copolymer composition by evaporation. The removal of unreacted monomer is typically facilitated by the application of a vacuum to the reaction vessel.

Any suitable free radical initiator may be used in the making of the copolymer. Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some case up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer-acceptor monomer alternating segments. The addition time is not so long as to render the process economically unfeasible on a commercial scale. The addition time may vary in any range of values inclusive of those stated above.

After mixing or during addition and mixing, polymerization of the monomers takes place. The polymerization can be run at any suitable temperature. Suitable temperature for the present method may be ambient, at least 50° C., in many cases at least 60° C., typically at least 75° C., and, in some cases, at least 100° C. Suitable temperature for the present method may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The polymerization can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results from the polymerization may be utilized as a starting material for the preparation of other polymers by using functional group transformations by methods known in the art. Functional groups that can be introduced by these methods are epoxy, carboxylic acid, hydroxy, amide, oxazoline, acetoacetate, isocyanate, carbamate, amine, amine salt, quaternary ammonium, thioether, sulfide, sulfonium, phosphonium, and phosphate.

For example, a copolymer comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer directly by using glycidyl acrylate in the copolymer preparation or indirectly by functional group transformation. One example of an indirect method is to oxidize residual unsaturation in the copolymer to epoxy groups using a peracid, such as peroxyacetic acid. Alternatively one can prepare a carboxyl-functional copolymer by hydrolysis as described above, treat the carboxyl-functional copolymer with epichlorohydrin, then alkali to produce the epoxy functional copolymer. These transformations can also be carried out exhaustively or in part. The resulting epoxy-functional copolymer can be further reacted with the appropriate active hydrogen-containing reagents to form alcohols, amines or sulfides.

Hydroxyl groups can be introduced directly using a hydroxyl-functional monomer, such as hydroxyethyl acrylate in the copolymer, or they can be introduced by functional group transformation. By treating the carboxyl-functional copolymer described above with an epoxy one can produce a hydroxyl functional polymer. Suitable epoxies include, but are not limited to, ethylene oxide, propylene oxide, butylene oxide, and glycidyl neodecanoate.

Hydroxyl functional monomers are particularly preferred in the preparation of the copolymer. Though not intending to be bound by any theory, it is believed that hydroxyl functionality in the copolymer, particularly primary hydroxyl functionality, contributes to the sag control and improved levelling exhibited by the curable film-forming composition of the present invention upon application to a substrate, and may eliminate the need for auxiliary flow control agents.

The above-described hydroxyl functional copolymers can be further reacted to form other copolymers. For example, a copolymer containing hydroxyethyl groups can be treated with a carbamylating agent, such as methyl carbamate, to produce the corresponding carbamate functional copolymer. With diketene or t-butyl acetoacetate, the hydroxyl groups can also be converted to acetoacetate esters.

Isocyanate-functional copolymers can also be produced. Copolymers that contain 2 or more hydroxyl groups can be treated with a diisocyanate, such as isophorone diisocyanate, to produce isocyanate-functional polymers. Primary amine functional copolymers, described above, can be phosgenated to produce isocyanate functionality.

Ionic functionality can be incorporated into the copolymer by any means known in the art. Carboxylate groups can be introduced by hydrolysis of ester groups in the copolymer followed by reaction with base. Amine salts can be introduced by preparing the present copolymer with an amine functional acrylate, such as dimethylaminoethyl acrylate, followed by protonation of the amino groups with an acid. Amine salts can also be introduced by reacting a glycidyl functional copolymer with ammonia or an active hydrogen-containing amine followed by protonation with acid. Quaternary amine functional groups or ternary sulfonium groups can be introduced into the copolymer by treating an epoxy functional copolymer of the present method with a tertiary amine or sulfide, respectively, in the presence of a protic acid.

In order to prepare the waterborne film-forming composition of the present invention, the polymeric binder (a) may be prepared in any of several ways. Copolymers can be prepared via aqueous emulsion polymerization techniques and used directly in the preparation of the aqueous coating compositions, or can be prepared via organic solution polymerization techniques with groups capable of salt formation, such as acid or amine groups. Upon neutralization of these groups with a base or acid, the polymers can be dispersed into aqueous medium. Generally, any method of producing such polymers that is known to those skilled in the art utilizing art recognized amounts of monomers can be used.

In a separate embodiment of the invention, the polymeric binder (a) may be prepared as a blend of acrylic materials and a donor-monomer-acceptor monomer type copolymer (i.e., containing the structure —[DM—AM]— as described above), in microparticulate form by a high stress technique using a homogenizer. This technique is described in U.S. Pat. No. 5,071,904, incorporated herein by reference.

In this technique, the polymeric binder (a) is a latex which comprises polymeric microparticles prepared by forming a mixture in aqueous medium. The mixture contains an ethylenically unsaturated monomer or mixture of ethylenically unsaturated monomers combined with greater than 30 percent by weight of a donor monomer-acceptor monomer type copolymer. The percent by weight is based on the total weight of ethylenically unsaturated monomer(s) and copolymer. The donor monomer-acceptor monomer type copolymer is prepared first using known techniques such as solution polymerization. This advantageously allows for removal of solvents before combining the copolymer with the acrylic monomers. The monomer(s) and copolymer are particularized into microparticles by high stress techniques using a homogenizer followed by polymerizing the ethylenically unsaturated monomer(s) to form polymeric microparticles which are stably dispersed in the aqueous medium. These microparticles can be internally crosslinked so as to form microgels.

Generally, the polymeric binder (a) is present in an amount ranging from about 55 to about 99 weight percent based on the total weight of resin solids in the film-forming composition, typically about 55 to about 90 weight percent and, more often, about 55 to about 85 weight percent.

As mentioned above, the waterborne film-forming composition of the present invention further includes (b) a crosslinking agent having at least two functional groups that are reactive with the functional groups of the polymeric binder (a). Suitable crosslinking agents include aminoplasts, polyisocyanates, polyacids, anhydrides, and mixtures thereof. Useful aminoplast resins are based on the addition products of formaldehyde with an amino- or amido-group carrying substance. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal, and the like.

Condensation products of other amines and amides can also be used, for example, aldehyde condensates of triazines, diazines, triazoles, guanadines, guanamines, and alkyl- and aryl-substituted derivatives of such compounds, including alkyl- and aryl-substituted ureas, and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, 2-mercapto-4,6-diaminopyrimidine and carbamoyl triazines of the formula C3N3(NHCOXR)3 where X is nitrogen, oxygen or carbon and R is a lower alkyl group having from one to twelve carbon atoms or mixtures of lower alkyl groups, such as methyl, ethyl, propyl, butyl, n-octyl and 2-ethylhexyl. Such compounds and their preparation are described in detail in U.S. Pat. No. 5,084,541, which is hereby incorporated by reference.

The aminoplast resins preferably contain methylol or similar alkylol groups and, in most instances, at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. The preferred aminoplast resins are partially alkylated with methanol or butanol.

Polyisocyanate crosslinking agents can be prepared from a variety of isocyanate-containing materials. Most often, the polyisocyanate is a blocked polyisocyanate. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used. Examples of suitable blocking agents include those materials that would unblock at elevated temperatures such as lower aliphatic alcohols including methanol, oximes such as methyl ethyl ketoxime, lactams such as caprolactam and pyrazoles such as 3,5-dimethyl pyrazole.

Examples of polycarboxylic acids that are suitable for use as the crosslinking agent in the aqueous curable film-forming composition of the present invention include those described in U.S. Pat. No. 4,681,811, at column 6, line 45 to column 9, line 54. Suitable polyanhydrides include those disclosed in U.S. Pat. No. 4,798,746, at column 10, lines 16–50, and in U.S. Pat. No. 4,732,790, at column 3, lines 41–57.

Generally, the crosslinking agent (b) is present in an amount ranging from about 1 to about 45 weight percent based on the total weight of resin solids in the film-forming composition, typically about 10 to about 45 weight percent and, more often, about 15 to about 45 weight percent.

A non-limiting example of the present waterborne thermosetting composition is one where the functional group of the copolymer is hydroxy and the functional group of the crosslinking agent is a capped polyisocyanate, where the capping group of the capped polyisocyanate crosslinking agent is one or more of hydroxy functional compounds, 1H-azoles, lactams, ketoximes, and mixtures thereof. The capping group may be phenol, p-hydroxy methylbenzoate, 1H-1,2,4-triazole, 1H-2,5-dimethylpyrazole, 2-propanone oxime, 2-butanone oxime, cyclohexanone oxime, e-caprolactam, or mixtures thereof. The polyisocyanate of the capped polyisocyanate crosslinking agent is one or more of 1,6-hexamethylene diisocyanate, cyclohexane diisocyanate, α,α'-xylylene diisocyanate, α,α,α',α'-tetramethylxylylene diisocyanate, 1-isocyanato-3,3,5-trimethyl-5-isocyanatomethylcyclohexane, diisocyanato-dicyclohexylmethane, dimers of the polyisocyanates, or trimers of the polyisocyanates.

When the copolymer has hydroxy functionality, it will typically have a hydroxy equivalent weight of from 100 to 10,000 grams/equivalent. The equivalent ratio of isocyanate equivalents in the capped polyisocyanate crosslinking agent to hydroxy equivalents in the hydroxy functional copolymer is typically within the range of 1:3 to 3:1. In this embodiment, the capped polyisocyanate crosslinking agent is present in the liquid thermosetting composition in an amount of from 1 to 45 percent by weight, based on total weight of resin solids, and the hydroxy functional copolymer is present in an amount of from 55 to 99 percent by weight, based on total weight of resin solids.

Another non-limiting example of the present waterborne thermosetting composition is one where the copolymer has epoxy functional groups and the crosslinking agent is a carboxylic acid functional compound having from 4 to 20 carbon atoms. The carboxylic acid crosslinking agent may be one or more of azelaic acid, adipic acid, 1,6-hexanedioic acid, succinic acid, pimelic acid, sebacic acid, maleic acid, citric acid, itaconic acid, or aconitic acid.

A further non-limiting example of the present waterborne thermosetting composition is one where the copolymer has carboxylic acid functional groups and the crosslinking agent is a beta-hydroxyalkylamide compound. The waterborne film-forming composition may further include a second polycarboxylic acid functional material selected from the group consisting of $C_4$ to $C_{20}$ aliphatic carboxylic acids, polymeric polyanhydrides, polyesters, polyurethanes and mixtures thereof. The beta-hydroxyalkylamide may be represented by the following structure IX:

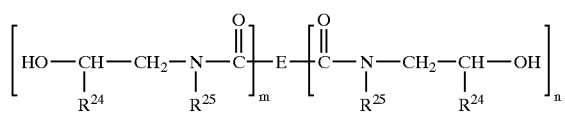

(IX)

where $R^{24}$ is H or $C_1$–$C_5$ alkyl; $R^{25}$ is H, $C_1$–$C_5$ alkyl structure X:

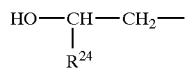

(X)

for which $R^{24}$ is as described above, E is a chemical bond or monovalent or polyvalent organic radical derived from saturated, unsaturated, or aromatic hydrocarbon radicals including substituted hydrocarbon radicals containing from 2 to 20 carbon atoms, m is 1 or 2, n is from 0 to 2, and m+n is at least 2.

The waterborne thermosetting composition of the present invention is preferably used as a film-forming (coating) composition and may contain adjunct ingredients conventionally used in such compositions. Optional ingredients such as, for example, plasticizers, surfactants, thixotropic agents, anti-gassing agents, anti-oxidants, UV light absorbers and similar additives conventional in the art may be included in the composition. These ingredients are typically present at up to about 40% by weight based on the total weight of resin solids. It is believed that the use of the copolymer described above as the polymeric binder (a) in the film-forming composition of the present invention reduces or may even eliminate the need for flow control additives in the composition.

The waterborne thermosetting composition of the present invention may be cationic, anionic, or nonionic, but typically it is anionic. The composition typically has a total solids content of about 40 to about 80 percent by weight. The waterborne thermosetting compositions of the present invention will often have a VOC content of less than 4 percent by weight, typically less than 3.5 percent by weight and many times less than 3 percent by weight.

The thermosetting composition of the present invention may contain color pigments conventionally used in surface coatings and may be used as a monocoat; that is, a pigmented coating. Suitable color pigments include, for example, inorganic pigments such as titanium dioxide, iron oxides, chromium oxide, lead chromate, and carbon black, and organic pigments such as phthalocyanine blue and phthalocyanine green. Mixtures of the above-mentioned pigments may also be used. Suitable metallic pigments include, in particular, aluminum flake, copper bronze flake, and metal oxide coated mica, nickel flakes, tin flakes, and mixtures thereof.

In general, the pigment is incorporated into the coating composition in amounts up to about 80 percent by weight based on the total weight of coating solids. The metallic pigment is employed in amounts of about 0.5 to about 25 percent by weight based on the total weight of coating solids.

In the present invention, the thermosetting composition comprises a resinous phase dispersed in an aqueous medium. The resinous phase includes an ungelled copolymer composition that includes the copolymer composition described above having a functional group containing one or more active hydrogen groups and a suitable ionic group; and a curing agent having at least two functional groups that are reactive with the active hydrogen groups of the copolymer. Suitable ionic groups include anionic groups and cationic groups. A non-limiting example of a suitable cationic group is an onium salt group. The active hydrogen group-containing copolymer typically has a number average molecular weight in the range of from 1,000 to 30,000.

The functional copolymer has an equivalent weight of from 100 to 5,000 grams/equivalent and the equivalent ratio of functional groups in the curing agent to equivalents in the functional copolymer is within the range of 1:3 to 3:1.

The curable film-forming composition of the present invention is in the form of an aqueous dispersion. The term "dispersion" is believed to be a two-phase transparent, translucent, or opaque resinous system in which the resin is in the dispersed phase and the water is in the continuous phase. The average particle size of the resinous phase is generally less than 1.0 and usually less than 0.5 microns, preferably less than 0.15 micron.

The onium salt functional monomers are typically one or more of quaternary ammonium salts and ternary sulfonium salts. Non-limiting examples of onium salt functional monomers, residues of which may be included in the present functional copolymer include an epoxy group-containing ethylenically unsaturated monomer which after polymerization has been post-reacted with an amine acid salt, an amine acid salt of dimethyl aminoethyl acrylate, or dimethyl aminoethyl methacrylate and at least one epoxy group-containing monomer which after polymerization has been post-reacted with a sulfide in the presence of an acid.

The thermosetting compositions described above can be applied to various substrates to which they adhere, including wood; metals such as ferrous substrates and aluminum substrates; glass; plastic, plastic and sheet molding compound-based plastics.

The compositions can be applied by conventional means including brushing, dipping, flow coating, spraying, and the like, but they are most often applied by spraying. The usual spray techniques and equipment for air spraying and electrostatic spraying and either manual or automatic methods can be used. Substrates that may be coated by the method of the present invention include, for example, wood, metal, glass, and plastic.

Upon application to a substrate, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving water and any coalescing solvents out of the film by heating or by an air drying period. Preferably, the heating will only be for a short period of time, sufficient to ensure that any subsequently applied coatings can be applied to the film without dissolving the composition. Suitable drying conditions will depend on the particular composition but, in general, a drying time of from about 1 to 5 minutes at a temperature of about 68–250° F. (20–121° C.) will be adequate. More than one coat of the composition may be applied to develop the optimum appearance. Between coats, the previously applied coat may be flashed, that is, exposed to ambient conditions for about 1 to 20 minutes.

The coalesced thermosetting composition is next cured by the application of heat. As used herein and in the claims, by "cured" is meant a three dimensional crosslink network formed by covalent bond formation, e.g., between the free isocyanate groups of the crosslinking agent and the hydroxy groups of the polymer. The temperature at which the thermosetting composition of the present invention cures is variable and depends in part on the type and amount of catalyst used. Typically, the thermosetting composition has a cure temperature within the range of 130° C. to 160° C., e.g., from 140° C. to 150° C.

In accordance with the present invention, there is further provided a multi-component composite coating composition that includes a base coat deposited from a pigmented film-forming composition; and a transparent top coat applied over the base coat. Either the base coat or the transparent top coat or both coats may include the waterborne thermosetting composition described above. The multi-component composite coating composition as described herein is commonly referred to as a color-plus-clear coating composition.

The pigmented film-forming composition from which the base coat is deposited can be the film-forming composition of the present invention or any other compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, polyurethanes, and the copolymer composition of the present invention.

The resinous binders for the pigmented film-forming base coat composition can be organic solvent-based materials, such as those described in U.S. Pat. No. 4,220,679, note column 2, line 24 through column 4, line 40. Also, water-based coating compositions such as those described in U.S. Pat. Nos. 4,403,003, 4,147,679, and 5,071,904 can be used as the binder in the pigmented film-forming composition.

The pigmented film-forming base coat composition is colored and may also contain metallic pigments. Examples of suitable pigments can be found in U.S. Pat. Nos. 4,220,679, 4,403,003, 4,147,679, and 5,071,904.

Ingredients that may be optionally present in the pigmented film-forming base coat composition are those which are well known in the art of formulating surface coatings and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,769, and 5,071,904.

The pigmented film-forming base coat composition can be applied to the substrate by any of the conventional coating techniques, such as brushing, spraying, dipping, or flowing, but are most often applied by spraying. The usual spray techniques and equipment for air spraying, airless spray, and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition onto the substrate, and prior to application of the transparent top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat is applied over the deposited base coat by any of the methods by which coatings are known to be applied. In an embodiment of the present invention, the transparent top coat is applied by electrostatic spray application. When the transparent top coat is applied over a deposited base coat that has been dried, the two coatings can be co-cured to form the multi-component composite coating composition of the present invention. Both the base coat and top coat are heated together to conjointly cure the two layers. Typically, curing conditions of 130° C. to 160° C. for a period of 20 to 30 minutes are employed. The transparent top coat typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

EXAMPLE A

Example A illustrates the preparation of a copolymer containing isobutylene in accordance with the present invention. Reactants were combined as described below:

|  | Material | Example 1 |
|---|---|---|
| Charge #1 | Methylisobutyl Ketone | 362.2 |
| Charge #2 | Di-t-amyl peroxide | 60 |
| Charge #3 | Isobutylene | 500 |
| Charge #4 | Butyl Acrylate | 420 |
|  | Hydroxyethyl Acrylate | 600 |
|  | Acrylic Acid | 60 |
|  | Styrene | 420 |
| % Solids |  | 82 wt. % |
| GPC | Mw | 13703 |
|  | Mn | 3210 |
|  | Mw/Mn | 4.30 |

Charge #1 was added to a reaction vessel equipped with an agitator, a thermocouple, and a nitrogen inlet. The vessel was sealed, the solution was placed under a nitrogen blanket and heated to 160° C. Charge #2 was added to the reaction vessel over 2.5 hours. Fifteen minutes after Charge #2 was initiated Charge #3 and Charge #4 were started over a period of 2 hours. During the addition periods, the reactor temperature was maintained at 140 to 160° C. and pressures varied from 40 psi to 340 psi. After completion of Charge #2, the reaction mixture was held 2 hours at 140 to 150° C. The reaction mixture was then cooled to <60° C. and relieved of residual pressure and vacuum stripped of any unreacted isobutylene for 1 hour at <100 mm Hg vacuum at 60° C. After the vacuum distillation was complete, the reaction mixture was cooled to ambient temperature. The solids were determined by holding a sample at 110° C. for one hour and calculating weight loss. Molecular weight was determined by gel permeation chromatography using polystyrene standards, COOH equivalent weight was determined by titration with 0.1N methanoic KOH and found to be 2472 grams/COOH at processed solids. The hydroxyl number was determined by STM-0217 and found to be 134.

714 grams of deionized water was charged to a 4 liter vessel and heated to 60° C. At 60° C., 21.2 grams dimethylethanol amine was added to the water and vigorous agitation was applied to the vessel containing the water and DMEA with a 3-inch hi-lift stirring blade. 611.5 grams of the above copolymer was added to a water/amine mixture. An additional 791.7 grams of water was added. The solids were determined by holding a sample at 110° C. for one hour and calculating weight loss.

EXAMPLE B

This example illustrates the preparation of an acrylic latex to be used as a resinous binder in curable film-forming compositions.

|  | WT. |
|---|---|
| CHARGE #1: TO ROUND BOTTOM FLASK |  |
| Acrylic copolymer[1] | 288.37 |
| Trixene DP 9B/1504 ®[2] | 37.25 |
| Methylisobutyl ketone | 6.69 |
| CHARGE #2: TO FLASK |  |
| TINUVIN ® 400[3] | 6.34 |
| TINUVIN ® 123[4] | 2.17 |
| BYK ®-390[5] | 2.61 |
| POLYBUTYLACRYLATE[6] | 1.30 |
| DIBUTYLTINDILAURATE | 0.59 |
| DIMETHYL ETHANOLAMINE | 3.27 |
| SURFYNOL ® 2502[7] | 1.83 |
| CHARGE #3: TO AN ADDITION FUNNEL |  |
| MIBK | 6.69 |
| CHARGE #4: TO 12 LITER FLASK |  |
| DMEA | 0.82 |
| DEIONIZED WATER | 376.24 |
| CHARGE #5 |  |
| DEIONIZED WATER | 12.45 |
|  | 746.61 |
| CHARGE #6: TO 12 L FLASK BEFORE VAC STRIP |  |
| FOAM KILL ® 649[8] | 0.12 |
| CHARGE #7: TO FLASK AS NEEDED |  |
| FOAM KILL ® 649 | 0.08 |

Notes:
[1]Copolymer prepared from hydroxyethyl methacrylate, 2-ethylbexyl acrylate, styrene, acrylic acid, CARDURA E (glycidyl esters of mixtures of tertiary aliphatic carboxylic acids, commercially available from Shell Chemical Company), in a 19.90:10.15:30.30:11.00:28.65 weight ratio, 64 percent solids by weight in methyl isobutyl ketone
[2]Isocyanurate of 1,6-hexamethylenediisocyanate blocked with 3,5-dimethyl pyrazole, at 70% solids in methyl isobutyl ketone, available from Baxenden Chemicals Limited, England.
[3]Available from Ciba-Geigy Corporation
[4]Sterically hindered tertiary amine light stabilizer available from Ciba Geigy Corporation
[5]Available from BYK Chemie USA
[6]Available as a 60% solids solution from DuPont
[7]Acetylenic alcohol surfactant available from Air Products and Chemicals Co.
[8]Aliphatic hydrocarbon, available from Crucible Chemical Charge #1 and #2 were added to a reaction flask in order and mixed until homogeneous. Charge #4 was heated separately to 25° C. at 350 rpm. The mixture of Charge #1 and #2 was added into Charge #4 over 1 hr. When addition was complete, Charge #3 was added as a rinse to the flask and the mixture held at least 30 min. The mixture was passed through a Microfluidizer® homogenizer (available from Microfluidics Corporation) at 11,500 psi with cooling water. Charge #5 followed as a rinse through the homogenizer and the entire mixture set up for total distillation. Charge #6 was then added to the batch under agitation (350 rpm). A nitrogen sweep was started, followed by vacuum at 450–550 mmHg. The batch was heated to 40° C., increasing temperature as needed (max 60° C.). Vacuum was slowly increased as needed; >100 mmHg, using $N_2$ to control foam. Deionized water was added as needed to adjust solids to 46.0+/−1.5%. The reaction product was cooled to <40° C., then filtered through a 5 micron (jacketed) filter bag. The resulting dispersion had a resin solids content of about 46%, a pH of 8.7, and a particle size of about 1600 Angstroms.

EXAMPLE C

This example describes the preparation of an aqueous polysiloxane polyol dispersion, a product of the hydrosilylation of pentasiloxane with an approximate degree of polymerization of 3 to 4, i.e., $(Si-O)_3$ to $(Si-O)_4$. The polysiloxane polyol was prepared from the following mixture of ingredients:

| Ingredients | Equivalents Weight | Equivalents | Parts By Weight (kilograms) |
|---|---|---|---|
| Charge I: |  |  |  |
| Trimethylolpropane monoallyl ether | 174.0 | 756.0 | 131.54 |
| Charge II: |  |  |  |
| MASILWAX BASE[1] | 156.7[2] | 594.8 | 93.21 |
| Charge III: |  |  |  |
| Chloroplatinic acid |  | 10 ppm |  |
| Toluene |  |  | 0.23 |
| Isopropanol |  |  | 0.07 |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids was added at ambient conditions and the temperature was gradually increased to 75° C. under a nitrogen blanket. At that temperature, 5.0% of Charge II was added under agitation, followed by the addition of Charge III, equivalent to 10 ppm of active platinum based on total monomer solids. The reaction was then allowed to exotherm to 95° C., at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

The reaction product above was post-reacted with methylhexahydrophthalic anhydride in a weight ratio of 81% polysiloxane:19% methylhexahydrophthalic anhydride. Afterward, the acid groups were neutralized with dimethylethanol amine to allow for dispersion in water. The final dispersed product had a weight composition of 41% polysiloxane, 9.6% methylhexahydrophthalic anhydride, 5.8% dimethylethanol amine, and 43.6% water.

Examples 1 and 2 illustrate the preparation of curable film-forming compositions. Example 1 illustrates the preparation of curable film-forming compositions using isobutylene-containing copolymers in accordance with the present invention. Example 2 is a control and contains no copolymers of isobutylene type monomers.

Ingredients were combined as described below.

EXAMPLE 1

| Ingredient | Weight, g |
| --- | --- |
| Copolymer of Example A | 300.0 |
| Premix 1 | |
| Cymel ® 327[1]/Aerosil ®200[2] | 22.2 |
| Deionized Water | 30.0 |
| Premix 2 | |
| Dodecylbenzenesulfonic Acid | 0.2 |
| Dimethylethanolamine 50% in Deionized Water | 0.182 |
| Deionized Water | 0.160 |

[1]Cymel ® 327: Highly methylated, high imino content melamine formaldehyde resin in isohutanol available from available from Cytec Industries, Inc.
[2]Aerosil ® 200 fumed silica available from Degussa Corporation In a first premix, Cymel® 327 was stirred and Aerosil® 200 added in a 90:10 ratio (Cymel® 327:Aerosil® 200). The mixture was then mixed in a pigment dispersion mill (Eiger mill) to achieve a Hegan value of 7+. In a second premix, 0.2 parts dodecylbenzenesulfonic acid was agitated while slowly adding dimethylethanolamine (50% in deionized water).

The acrylic latex was placed under agitation and deionized water added. The mixture was allowed to stir to ensure full incorporation. Premix 1 and premix 2 were then added separately with stirring after each addition. The final composition had a solids content of 28%, and a viscosity of 30 seconds, measured using a #4 DIN cup.

EXAMPLE 2 (CONTROL)

A curable film-forming composition was prepared using a method similar to that described in Example 1. Ingredients were combined as described below.

| Resin Code | Resin Solids | Resin weight | Solution Weight |
| --- | --- | --- | --- |
| Acrylic latex of Example B | 46.8 | 85.9 | 183.5 |
| Byk ® 345[1] | 100.0 | 0.48 | 0.48 |
| Byk ® 325[2] | 50.0 | 0.12 | 0.24 |
| Polysiloxane of Example C | 47.1 | 2.00 | 4.30 |
| 2,2,4 Trimethyl-1,3-pentanediol monoisobutyrate | — | — | 9.0 |
| Butyl Acetate | — | — | 3.0 |
| Water | — | — | 15.0 |
| Polyurethane[3] | 40.9 | 3.0 | 7.7 |
| Cymel ® 327[4]/Aerosil ® 200[5] | 85.3 | 17.3 | 20.3 |
| Cymel ® 303[6] | 98 | 3.0 | 3.0 |
| DDBSA/DMEA | 37 | 0.2 | 0.5 |
| Borchigel ® LW44[7] | 20 | — | 1.5 |
| Total weight | | 112.0 | 248.5 |
| % paint solids | | | 45% |

[1]additive available from BYK-Chemie USA
[2]Anti-mar additive available from BYK-Chemie USA
[3]waterborne polyurethane prepared from isophorone diisocyanate reacted with methoxypolyethylene glycol having a molecular weight of 2000, in a 1:1 equivalent ratio.
[4]Cymel ® 327: Highly methylated, high imino content melamine formaldehyde resin in isobutanol available from available from Cytec Industries, Inc.
[5]Aerosil ® 200: fumed silica available from Degussa Corporation
[6]Hexamethoxymethyl melamine formaldehyde resin available from Cytec Industries, Inc
[7]Borchi Gel ® LW 44 available from Borchers In a first premix, Cymel® 327 was stirred and Aerosil® 200 added in a 90:10 ratio (Cymel® 327:Aerosil® 200). The mixture was then mixed in a pigment dispersion mill (Eiger mill) to achieve a Hegan value of 7+. In a second premix, 0.2 parts dodecylbenzenesulfonic acid was agitated while slowly adding dimethylethanolamine (50% in deionized water). In a third premix, 0.24 parts Borchi Gel® LW 44 was stirred while adding deionized water until the premix was of uniform consistency.

The acrylic latex was placed under agitation and BYK® 325, BYK® 345, and the waterborne polysiloxane were added. The mixture was allowed to stir to ensure full incorporation. 2,2,4 Trimethyl-1,3-pentanediol monoisobutyrate and butyl acetate were then added in order under moderate agitation. The mixture was again allowed to stir to ensure full incorporation. The following ingredients were then added separately with stirring after each addition: deionized water, isophorone diisocyanate mixture, premix 1, Cymel® 303, and premix 2. Premix 3 was used to adjust viscosity.

The film-forming compositions of Examples 1 and 2 were applied over two separate sets of primed and base coated steel substrate panels for property testing. The primer used on the substrate is commercially available from PPG Industries, Inc. and is identified as 1177225AR. In one set of panels, the base coat used on the substrate is commercially available from PPG Industries, Inc. and is identified as EWB Reflex Silver. In a second set of panels, the base coat used on the substrate is commercially available from PPG Industries, Inc. and is identified as EWB Obsidian Black. The film-forming compositions of Examples 1 and 2 were spray applied in two coats to the steel panels at a temperature of about 75° F. (24° C.). Approximately a 90 second flash time was allowed between the two coats. The resulting coating was then allowed to air flash at 75° F. (24° C.) for 10 minutes before baking to cure the film-forming compositions. The cure condition was a 22-minute bake at 293° F. (145° C).

Appearance and physical properties of the coated panels were measured as described in the following tests. DOI (distinction of image) was measured using a Dorigon II DOI meter from Hunter Lab. Specular gloss at 20° and haze were measured by a BYK Gardner® Haze-Gloss Meter. Higher numbers denote better performance. The smoothness of the clear coats was measured using a Byk Wavescan Plus® instrument in which results are reported as long wave and short wave numbers. Lower long wave and short wave numbers denote smoother films.

The test results for the cured compositions are shown in the following tables.

TABLE 1

| Example | 1 | 2 (Control) |
| --- | --- | --- |
| Primer: 1177225AR | | |
| Basecoat: EWB Obsidian Black | | |
| BC DFT | 10 | 10 |

TABLE 1-continued

| Example | | 1 | 2 (Control) |
|---|---|---|---|
| CC DFT | | 30 | 38 |
| Initial 20° Gloss | | 93 | 94 |
| Initial Haze | | 431 | 16 |
| Initial DOI | | 74 | 88 |
| Wave Scan | LW | 3 | 11 |
| | SW | 8 | 14 |

TABLE 2

| Example | | 1 | 2 (Control) |
|---|---|---|---|
| Primer: 1177225AR | | | |
| Basecoat: EWB Reflex Silver | | | |
| BC DFT | | 12 | 12 |
| CC DFT | | 30 | 38 |
| Initial 20° Gloss | | 93 | 100 |
| Initial Haze | | 431 | 337 |
| Initial DOI | | 74 | 75 |
| Wave Scan | LW | 3 | 5 |
| | SW | 8 | 14 |

Data in the tables indicate that curable film-forming compositions prepared according to the present invention demonstrate improved smoothness compared to a control that does not contain an isobutylene-type copolymer as a binder, evidenced by decreased long wave and short wave scan measurements, without significant loss of other essential properties, such as gloss, DOI, and acid etch resistance.

The present invention has been described with reference to specific details of particular embodiments thereof. It is not intended that such details be regarded as limitations upon the scope of the invention except insofar as and to the extent that they are included in the accompanying claims.

We claim:

1. A curable, aqueous film-forming composition comprising:
   (a) a copolymer serving as a polymeric binder containing two or more reactive functional groups, said copolymer comprising at least 30 mol % of residues having the following alternating structural units:

—[DM—AM]— wherein DM represents a residue from a donor monomer, and AN represents a residue from an acceptor monomer, at least 15 mol % of the copolymer comprising a donor monomer having the following structure (I):

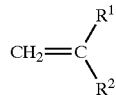

(I)

wherein $R^1$ is linear or branched $C_1$ to $C_4$ alkyl, $R^2$ is selected from the group consisting of methyl, linear, cyclic or branched $C_1$ to $C_{20}$ alkyl, alkenyl, aryl, alkaryl and aralkyl; and
   (b) a curing agent having at least two functional groups which are reactive with the reactive functional groups of (a).

2. The film-forming composition of claim 1, wherein at least 15 mol % of the copolymer comprises an acrylic monomer as an acceptor monomer.

3. The film-forming composition of claim 1, wherein the copolymer contains at least one salt group or salt forming group.

4. The film-forming composition of claim 1, wherein the copolymer contains hydroxyl functionality.

5. The film-forming composition of claim 1, wherein the copolymer is substantially free of maleate monomer segments and fumarate monomer segments.

6. The film-forming composition of claim 1, wherein the copolymer composition is substantially free of Lewis acids and transition metals.

7. The film-forming composition of claim 1, wherein the donor monomer is selected from the group consisting of isobutylene, diisobutylene, dipentene, isoprenol, styrene, methyl styrene, vinyl ethers, and vinyl pyridine.

8. The film-forming composition of claim 1, wherein the donor monomer of structure I is selected from the group consisting of isobutylene, diisobutylene, dipentene, and isoprenol.

9. The film-forming composition of claim 1, wherein the group $R^2$ of the donor monomer of structure I includes one or more functional groups selected from the group consisting of hydroxy, epoxy, carboxylic acid, ether, carbamate, and amide.

10. The film-forming composition of claim 1, wherein the acceptor monomer comprises monomers described by the structure (II):

(II)

wherein W is selected from the group consisting of —CN, —X, and —C(=O)—Y, wherein Y is selected from the group consisting of —NR$^3$$_2$, —O—R$^5$—O—C(=O)—NR$^3$$_2$, and —OR$^4$, R$^3$ is selected from the group consisting of H, linear or branched $C_1$ to $C_{20}$ alkyl, and linear or branched $C_1$ to $C_{20}$ alkylol, R$^4$ is selected from the group consisting of H, hydroxy functional poly(ethylene oxide), hydroxy functional poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl, fluoroalkaryl and fluoroaralkyl, and a polysiloxane radical, R$^5$ is a divalent linear or branched $C_1$ to $C_{20}$ alkylene linking group, and X is a halide.

11. The film-forming composition of claim 2, wherein the acrylic monomer is one or more described by structure (III):

(III)

wherein Y is selected from the group consisting of —NR$^3$$_2$, —O—R$^5$—O—C(=O)—NR$^3$$_2$, and —OR$^4$, R$^3$ is selected from the group consisting of H, linear or branched $C_1$ to $C_{20}$ alkyl and linear or branched $C_1$ to $C_{20}$ alkylol, R$_4$ is selected from the group consisting of H, ethylene oxide reaction products thereof, and propylene oxide reaction products thereof, linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, and a polysiloxane radical, and R$^5$ is a divalent linear or branched $C_1$ to $C_{20}$ alkylene linking group.

12. The film-forming composition of claim 1, wherein the copolymer in (a) includes at least one functional group selected from the group consisting of hydroxy, amide, oxazoline, acetoacetate, blocked isocyanate, carbamate, and amine.

13. The film-forming composition of claim 3, wherein the salt group is selected from the group consisting of carboxylic acid salt, amine salt, quaternized ammonium, quaternized phosphonium and ternary sulfonium.

14. The film-forming composition of claim 1, wherein the copolymer has a number average molecular weight of from 250 to 100,000.

15. The film-forming composition of claim 1, wherein the copolymer has a polydispersity index of less than 4.

16. The film-forming composition of claim 1, wherein the alternating structural units comprise at least 50 mol % of the copolymer.

17. The film-forming composition of claim 1, wherein the acceptor monomer is selected from the group consisting of hydroxyethyl acrylate, hydroxypropyl acrylate, 4-hydroxybutyl acrylate, acrylic acid, methyl acrylate, ethyl acrylate, butyl acrylate, isobutyl acrylate, isobornyl acrylate, dimethylaminoethyl acrylate, acrylamide, chlorotrifluoro ethylene, glycidyl acrylate, 2-ethylhexyl acrylate, and N-(butoxymethyl) acrylamide.

18. The film-forming composition of claim 1, wherein the copolymer comprises one or more residues derived from other ethylenically unsaturated monomers of general formula V:

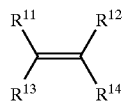

(V)

wherein $R^{11}$, $R^{12}$, and $R^{14}$ are independently selected from the group consisting of H, $CF_3$, straight or branched alkyl of 1 to 20 carbon atoms, aryl, straight or branched alkenyl or alkynyl of 2 to 10 carbon atoms, straight or branched alkenyl of 2 to 6 carbon atoms substituted with a halogen, $C_3$–$C_8$ cycloalkyl, heterocyclyl or phenyl, $R^{13}$ is selected from the group consisting of H, $C_1$–$C_6$ alkyl, and $COOR^{15}$, wherein $R^{15}$ is selected from the group consisting of H, an alkali metal, a $C_1$ to $C_6$ alkyl group, and aryl.

19. The film-forming composition of claim 18, wherein the other ethylenically unsaturated monomers are one or more selected from the group consisting of methacrylic monomers and allylic monomers.

20. The film-forming composition of claim 1, wherein the functional groups of the polymeric binder (a) are selected from the group consisting of hydroxyl, carbamate, blocked isocyanate, primary amine, secondary amine, amide, urea, urethane, vinyl groups and mixtures thereof.

21. The film-forming composition of claim 20, wherein the polymeric binder (a) contains carbamate functional groups.

22. The film-forming composition of claim 1, wherein the polymeric binder (a) comprises the reaction product of the following reactants:
(1) at least one polymerizable, ethylenically unsaturated monomer containing acid functional groups that are subsequently at least partially neutralized with base to form carboxylic acid salt groups; and
(2) at least one polymerizable, functional group-containing ethylenically unsaturated monomer free of acid functional groups.

23. The film-forming composition of claim 22, wherein reactant (1) comprises a carboxylic acid group-containing ethylenically unsaturated monomer.

24. The film-forming composition of claim 23, wherein reactant (1) is selected from the group consisting of acrylic acid, methacrylic acid, and mixtures thereof.

25. The film-forming composition of claim 22, wherein reactant (1) is present in the polymeric binder (a) in an amount sufficient to provide an acid value of up to 50 mg KOH/g.

26. The film-forming composition of claim 22, wherein reactant (2) comprises at least one hydroxyalkyl functional monomer selected from the group consisting of hydroxyethyl (meth)acrylate, hydroxypropyl (meth)acrylate, 4-hydroxybutyl (meth)acrylate and mixtures thereof.

27. The film-forming composition of claim 22, wherein reactant (2) comprises an ethylenically unsaturated, beta-hydroxy ester functional monomer.

28. The film-forming composition of claim 27, wherein the ethylenically unsaturated, beta-hydroxy ester functional monomer comprises the reaction product of reactants selected from the group consisting of the following:
(1) an ethylenically unsaturated epoxy functional monomer and a saturated carboxylic acid having at least 5 carbon atoms; and
(2) an ethylenically unsaturated acid functional monomer and an epoxy compound containing at least 5 carbon atoms which is not polymerizable with the ethylenically unsaturated acid functional monomer.

29. The film-forming composition of claim 22, wherein the reactants from which the polymeric binder (a) is formed further comprise reactant (3) at least one polymerizable, ethylenically unsaturated monomer different from (1) and (2).

30. The film-forming composition of claim 29, wherein reactant (3) is selected from the group consisting of vinyl aromatic monomers, alkyl esters of (meth)acrylic acid and mixtures thereof.

31. The film-forming composition of claim 22, wherein the acid value of the polymeric binder (a) ranges from 0 to 50 mg KOH/g.

32. The film-forming composition of claim 22, wherein the polymeric binder (a) is present in the film-forming composition in an amount ranging from 55 to 99 weight percent based on the total weight of resin solids in the film-forming composition.

33. The film-forming composition of claim 22, wherein the crosslinking agent (b) is selected from the group consisting of blocked isocyanates, aminoplast resins, and mixtures thereof.

34. The film-forming composition of claim 33, wherein the crosslinking agent (b) is an isocyanurate of 1,6-hexamethylene diisocyanate reversibly blocked with 3,5-dimethyl pyrazole.

35. The film-forming composition of claim 22, wherein the crosslinking agent (b) is present in the film-forming composition in an amount ranging from 1 to 45 weight percent based on total weight of resin solids present in the film-forming composition.

* * * * *